UNITED STATES PATENT OFFICE.

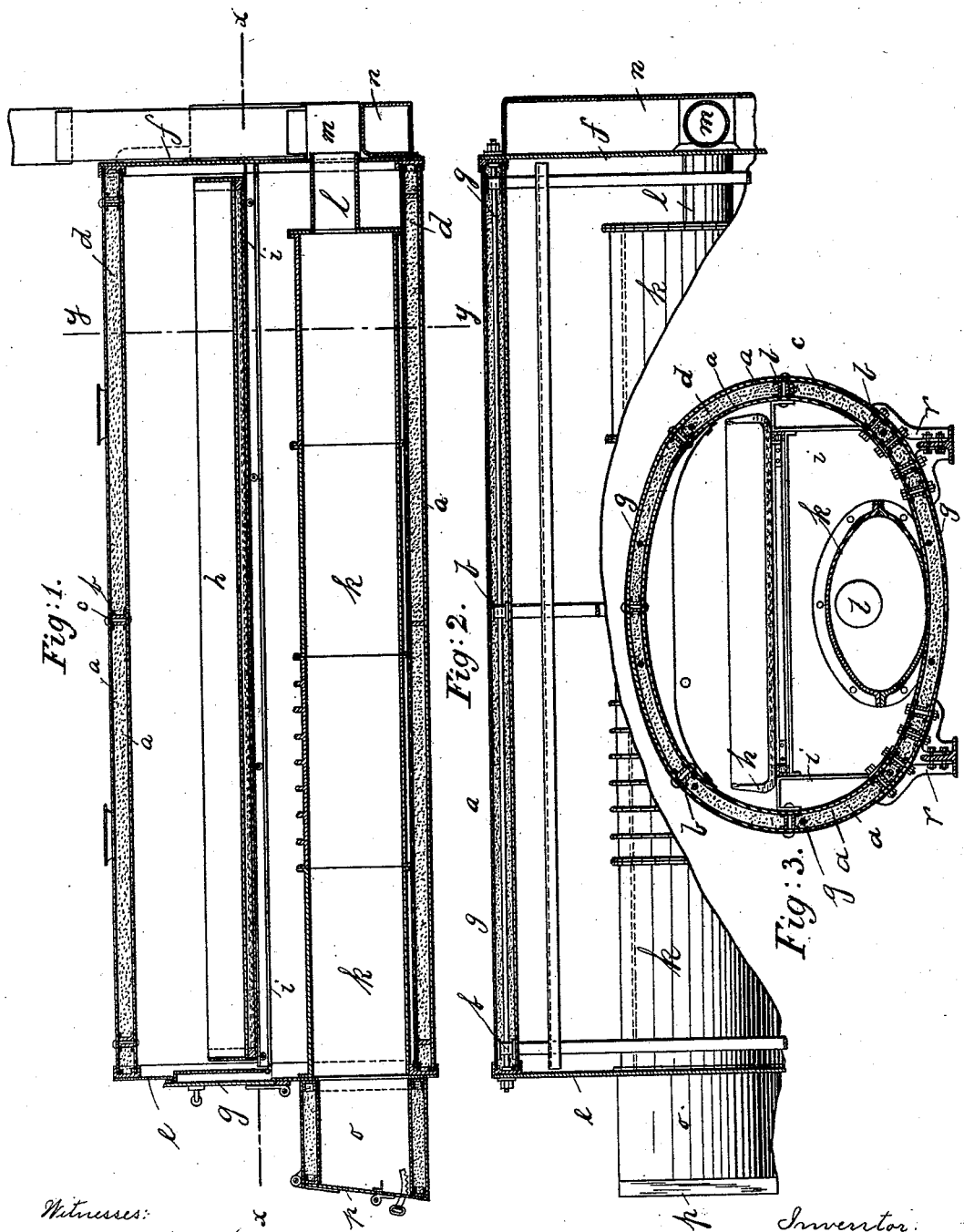

DAVID GROVE, OF BERLIN, GERMANY.

BAKING-OVEN.

SPECIFICATION forming part of Letters Patent No. 498,261, dated May 30, 1893.

Application filed January 4, 1893. Serial No. 457,277. (No model.)

*To all whom it may concern:*

Be it known that I, DAVID GROVE, manufacturer, a subject of the Emperor of Germany, residing at 24 Friedrich Strasse, Berlin, in the Empire of Germany, have invented certain new and useful Improvements in Baking-Ovens, of which the following is a full and clear description.

This invention relates to improvements in baking ovens, its object being to simplify the form and construction of same in such a manner that they can be used as stationary, as well as portable baking ovens for military and other similar purposes, the general construction and arrangement of the parts being of such a nature, that the oven can be kept working continuously, since the furnace is completely separated from the oven itself, and can be fired as required.

Referring to the drawings which form part of this specification, Figure 1 is a longitudinal sectional view of the baking oven. Fig. 2 is a horizontal section of part of the oven on lines $x$ $x$, of Fig. 1. Fig. 3 is a cross section on lines $y$, $y$ in Fig. 1.

The baking oven consists of an elliptical or other suitably formed body made of boiler plates $a$ $a$, the plates $a$ being kept at a certain distance from each other by the pieces $b$ through which bolts $c$ are driven, thus forming a sort of compartment or space between the walls $a$ which is filled with any suitable heat non-conducting material $d$, such as fossil meal, clinker, cinders or spun glass, ashes, &c., in order to prevent loss of heat by radiation. The body is closed in front and rear by head plates $e$ and $f$ which are fastened to the mantel by bolt rods $g$.

The baking trough or hearth $h$, which is preferably made out of double plates, in the space between which is filled a fire-proof material, or out of one plate with an equivalent lining, is held by brackets $i$ which are riveted on to the inner walls $a$ and so arranged that the baking trough or hearth can be easily slid in or out of the oven. For this purpose the baking trough can also be provided with rollers run on suitable rails.

The calorifere $k$ is arranged in the under part of the baking compartment in a smooth, corrugated or ribbed tubular body, the rear end of which is connected by a short flue pipe $l$ to the chimney $m$, the lower part of said chimney being preferably surrounded by a box-like casing $n$, the forward end of the calorifere being closed by the furnace door $p$. The calorifere is provided with an exterior furnace $o$ with heat protecting mantel, the baking space for receiving the baking troughs being accessible through the doors $q$.

The method of operation of the oven is as follows: The air in the baking compartment heated by the calorifere $k$ enters under the baking trough or hearth $h$, and through the side openings left between the brackets $i$, and ascends above the baking trough or hearth in order to heat contents of same from above. As soon as the air has given off a part of its heat, the same descends and is replaced by the heated air ascending from the calorifere, and in this manner a continuous circulation of the same quantity of air is effected and maintained, thus enabling the baking to be carried on both rapidly and uniformly. When the baking oven is employed for portable purposes, as, for instance, military field-baking ovens, and is arranged on the frame work of a carriage, it is only necessary to provide a mantel with brackets $r$ formed of figured or fancy iron, and which have a horizontal flange underneath.

The special feature or characteristic of the afore-described construction of baking oven is, that the firing takes place in an inclosed furnace which has only one outlet, and that to the chimney flue, so that the air in circulating round the baking troughs or hearths in the baking compartment is always re-heated after having given out its warmth to the former, and thus a continuous firing of the calorifere and use of the baking trough is made possible.

Having now described my invention, what I claim as new, and desire to secure by Letters Patent, is—

An oven comprising the elongated receptacle having a front door, the removable trough in said oven extending longitudinally thereof, and the elongated heating chamber $k$ having a furnace $o$ at its front end and a smoke pipe $l$, at its rear end, said heating chamber extending longitudinally along the lower part of the oven and within the walls thereof to near the rear end, substantially as described.

In witness whereof I have hereunto signed my name in the presence of two subscribing witnesses.

DAVID GROVE.

Witnesses:
    H. VAN OLDENNEEL,
    F. M. CARRYL.